(12) United States Patent
Zhang (10) Patent No.: US 9,471,642 B2
(45) Date of Patent: Oct. 18, 2016

(54) AUTOMATIC FLAGGING OF FREQUENTLY ACCESSED DATA OBJECTS FOR BUSINESS APPLICATION

(71) Applicant: Zhong Zhang, Palo Alto, CA (US)

(72) Inventor: Zhong Zhang, Palo Alto, CA (US)

(73) Assignee: SAP SE, Walldorf (DE)

( * ) Notice: Subject to any disclaimer, the term of this patent is extended or adjusted under 35 U.S.C. 154(b) by 260 days.

(21) Appl. No.: 14/051,321

(22) Filed: Oct. 10, 2013

(65) Prior Publication Data

US 2015/0106383 A1    Apr. 16, 2015

(51) Int. Cl.
G06F 17/30    (2006.01)

(52) U.S. Cl.
CPC ..... *G06F 17/3053* (2013.01); *G06F 17/30867* (2013.01)

(58) Field of Classification Search
CPC .................. G06F 17/30221; G06F 17/30315; G06F 17/3053; G06F 17/30867
USPC ........................................ 707/732, 737, 748
See application file for complete search history.

(56) References Cited

U.S. PATENT DOCUMENTS

| | | | |
|---|---|---|---|
| 5,584,035 A | 12/1996 | Duggan et al. | |
| 6,567,818 B1 | 5/2003 | Frey et al. | |
| 7,096,219 B1 * | 8/2006 | Karch | ............ G06F 21/316 |
| 7,478,093 B2 | 1/2009 | Moulckers et al. | |
| 7,698,291 B2 | 4/2010 | Ziv et al. | |
| 7,860,890 B2 | 12/2010 | Riemann et al. | |
| 7,870,265 B2 * | 1/2011 | Kramer | ............... H04L 67/1008 709/227 |
| 8,145,653 B2 | 3/2012 | Kosov et al. | |
| 8,171,492 B2 | 5/2012 | McGuire et al. | |
| 8,433,728 B2 | 4/2013 | Rodriguez et al. | |
| 8,938,462 B2 * | 1/2015 | Galvin, Jr. | ........ G06F 17/30699 707/749 |
| 9,049,259 B2 * | 6/2015 | Rathod | ............ H04N 21/44222 |
| 2004/0122826 A1 | 6/2004 | Mackie | |
| 2005/0021348 A1 | 1/2005 | Chan et al. | |
| 2005/0154699 A1 | 7/2005 | Lipkin et al. | |
| 2008/0132251 A1 * | 6/2008 | Altman | .............. G06Q 30/0207 707/999.1 |
| 2009/0327105 A1 | 12/2009 | Moussa et al. | |
| 2012/0259852 A1 * | 10/2012 | Aasen | ............... G06F 17/30867 707/737 |

OTHER PUBLICATIONS

Using Filters and Labels: Automatically mark or move multiple messages; Gmail online help; printed from Internet on Jul. 24, 2013; 2 pages; www.support.google.com.

(Continued)

*Primary Examiner* — Marc Filipczyk
(74) *Attorney, Agent, or Firm* — Fountainhead Law Group P.C.

(57) ABSTRACT

Embodiments relate to management of data accessed from a database. A usage tracking engine of an application layer overlying a database, may automatically track (e.g. with a time stamp) access to specific data objects by particular users. This automatic tracking may be based upon one or more of the following: frequency of access, recency of access, user geographic location, and user calendar events. Based upon this data, the tracking engine applies an algorithm to automatically identify those data objects meriting special handling for quick access (e.g. for placement in a "shelf" or other construct readily accessible to the user). A heuristic learning module may generate a data object ranking based upon the usage data, and communicate that ranking to the usage tracking engine to determine a data object's eligibility for placement on the "shelf". Such ranking may consider personalized settings, and/or a user's past manual shelf placement of data object(s).

18 Claims, 6 Drawing Sheets

(56) References Cited

OTHER PUBLICATIONS

Heinz Tschabitscher; How to Find Out Why Gmail Categorized a Message as Important; About.com Newsletter; Dec. 2011; 1 page; www.about.com.

SAP AG; SAP BusinessObjects Analysis, edition for OLAP User Guide; Mar. 16, 2012; 202; SAP AG; Walldorf; Germany; (http://help.sap.com/businessobject/product_guides/boexir4/en/xi4_aa_user_en.pdf).

Steve Rademacher; Free SDK Utilities to Help Manage Your Business Objects; asug annual conference 2012; Sep. 10, 2012; 39; (http://events.asug.com/2012BOUC/0501_Free_SD_Utilities_to_Help_Manage_Your_Business_Objects.pdf).

* cited by examiner

AUTOMATIC FLAGGING OF FREQUENTLY ACCESSED DATA OBJECTS FOR BUSINESS APPLICATION

BACKGROUND

The present invention relates to database systems, and in particular, to flagging data frequently accessed by a user of a business application.

Databases are increasingly relied upon for a number of business tasks. Often, the raw data present in an underlying database is accessed for use as part of a data object. Such a data object comprises a data structure that organizes a collection of individual pieces of related data, in a particular way.

For example, one type of business application that relies upon database information in the form of data objects, is Customer Relationship Management (CRM) software. In such a CRM application, a data object could comprise a customer, made up of constituent raw data from an underlying database in the form of a customer name, a customer address, a customer phone number, and others.

Large enterprise information systems may reference thousands of customers, each having multiple associated related pieces of information. Given the volume of different customers and the high frequency of contacting those customers, it may be difficult for an individual user of the database to effectively keep track the most frequently used business objects.

One conventional mechanism for tracking business objects, is to employ a "shelf" or other construct able to be used as a container to hold multiple most-used business objects for quick access. Conventionally, however, such an approach requires manual intervention from users in order to add or remove favorites from the shelf, and/or to flag particular business objects as favorites.

And, over time, business users may become busy with other tasks and to neglect to manually add/remove business objects to/from shelf. This can result in the material stored on the shelf becoming outdated.

Accordingly, there is a need in the art for a method for managing frequently accessed data objects.

SUMMARY

Embodiments relate to management of data frequently accessed from a database. Particular embodiments employ a usage tracking engine of an application layer overlying a database layer. On a per-user basis, the tracking engine automatically tracks (e.g. with a time stamp) access to specific data objects by particular users. This automatic tracking may be based upon one or more of the following: frequency of access, recency of access, user geographic location, and user calendar events. Based upon this data, the tracking engine applies an algorithm to automatically identify those data objects meriting special handling for quick access (e.g. for placement in a "shelf" or other construct readily accessible to the user). A heuristic learning module may generate a data object ranking based upon the usage data, and communicate that ranking to the usage tracking engine to determine a data object's eligibility for placement on the "shelf". Such ranking may further consider personalized settings, and/or a user's past manual placement of data object(s) on a shelf.

The following detailed description and accompanying drawings provide a better understanding of the nature and advantages of the present disclosure.

DETAILED DESCRIPTION

Described herein are techniques for automatic management of frequently accessed data of an underlying database. The apparatuses, methods, and techniques described below may be implemented as a computer program (software) executing on one or more computers. The computer program may further be stored on a tangible non-transitory computer readable medium, such as a memory or disk, for example. A computer readable medium may include instructions for performing the processes described below. In the following description, for purposes of explanation, numerous examples and specific details are set forth in order to provide a thorough understanding of the present invention. It will be evident, however, to one skilled in the art that embodiments defined by the claims may include some or all of the features in these examples alone or in combination with other features described below, and may further include modifications and equivalents of the features and concepts described herein.

Embodiments relate to management of data frequently accessed from a database. Particular embodiments employ a usage tracking engine of an application layer overlying a database layer. On a per-user basis, the tracking engine automatically tracks (e.g. with a time stamp) access to specific data objects by particular users. This automatic tracking may be based upon one or more of the following: frequency of access, recency of access, user geographic location, and user calendar events. Based upon this data, the tracking engine applies an algorithm to automatically identify those data objects meriting special handling for quick access (e.g. for placement in a "shelf" or other construct readily accessible to the user). A heuristic learning module may generate a data object ranking based upon the usage data, and communicate that ranking to the usage tracking engine to determine a data object's eligibility for placement on the "shelf". Such ranking may further consider personalized settings, and/or a user's past manual placement of data object(s) on a shelf.

Figure 1:
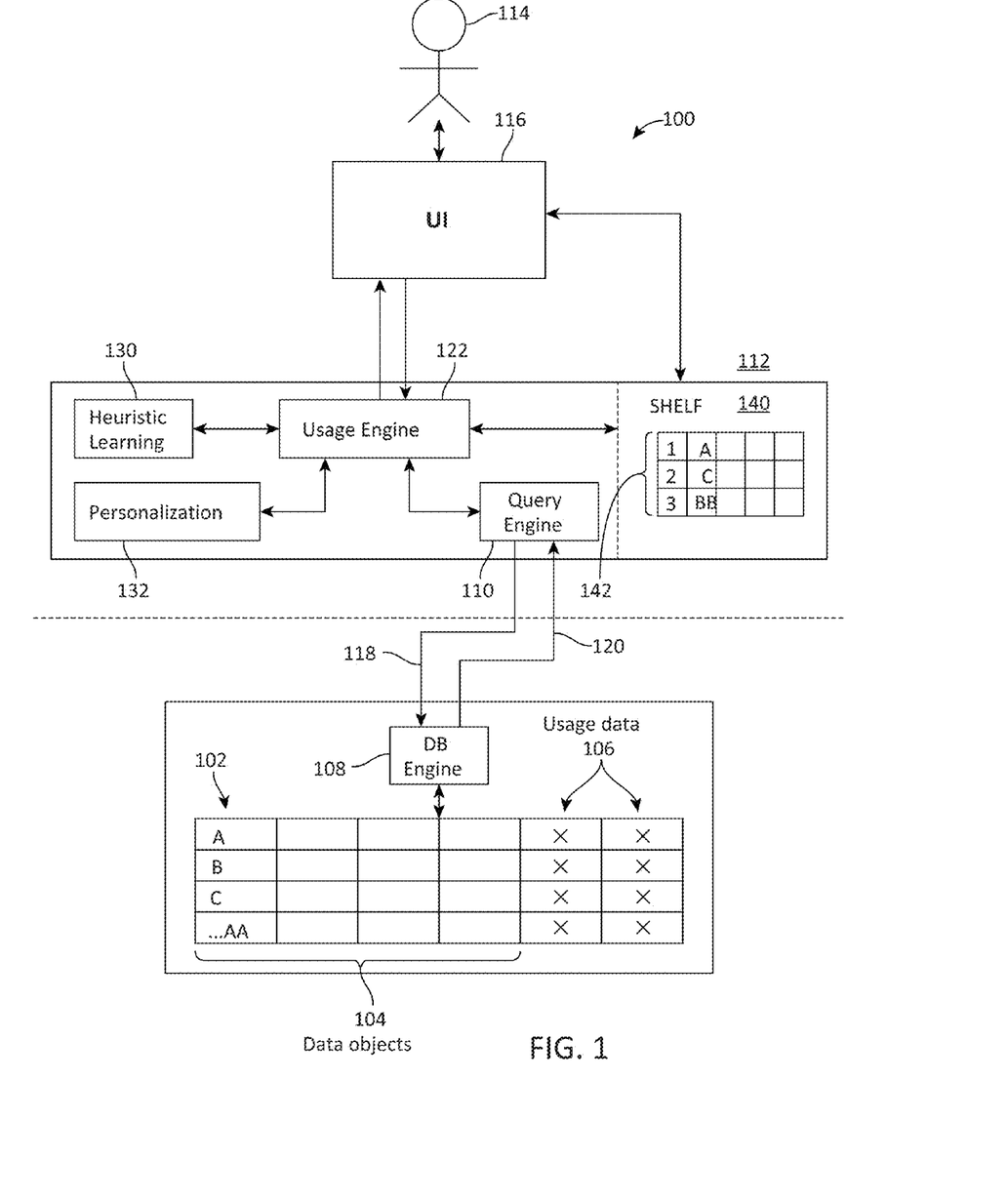
FIG. 1 is a simplified diagram illustrating a system for automatically tracking data objects according to an embodiment.

FIG. 1 shows a simplified view of a system 100 according to an embodiment. This system comprises a database 102, here a relational database comprising raw data organized in rows and columns. As is described below, some of this raw data (e.g. portions of rows) may comprise data object information 104, while other of this raw data may comprise usage data 106 (e.g. time stamps, access counters etc.) relevant to user access of those data objects.

Access to the raw data of the database is controlled via a database engine 108, that is in communication with a query engine 110 of an overlying application layer 112. In particular, a user 114 interacts with the query engine (and the underlying database engine) via a user interface 116.

The user formulates queries 118 requesting particular information from the database. In response, the database engine furnishes a query result 120 providing relevant information to the user.

The diagram shows that for each individual user, a usage tracking engine 122 may automatically track all of the data usages for each user (e.g. with time stamps). Examples of such usage data may include how many times the business object "opportunity ABC" is accessed in display mode, how many times that "opportunity ABC" is changed in the last week etc.

Embodiments provide an automated process to add/remove most accessed business objects on an end users' shelf 140 with an optimized algorithm. This determination can be based on factors such as a frequency and/or recency of the access of the business objects per user. In this manner the system may automatically manage a user's shelf for future access.

The diagram of FIG. 1 shows that for each individual user, the usage tracking engine automatically tracks access to specific data objects. The usage tracking engine performs this function based upon usage information collected from the query engine.

Based upon the usage information, the usage tracking engine places particular data objects into a highly accessible region 140 (hereafter also referred to as a "shelf"), according to a ranking 142. This placement of data object information on the shelf, eases the burden on the query engine, furnishing user access to the highest ranked data objects with greater speed and efficiency. In particular, locating data object information on the shelf avoids the need for the database engine to reconstruct/reassemble that data object from raw data each time, it is sought to be accessed.

The usage tracking engine is also responsible for collecting and recording the usage information. In some embodiments the usage engine may instruct the database engine to write usage information directly in the underlying database. As only one possible example, various different types of usage information may be appended as additional columns to rows representing the raw data of particular business objects.

In certain embodiments, the usage information can include a time stamp reflecting a recency of access to a data object (e.g. an "opportunity ABC" data object comprising contact names, telephone numbers, emails, etc.) by a particular user. In various embodiments, the usage information can include a counter of access to that "opportunity ABC" data object by a particular user, thereby allowing rapid determination of a frequency of user access.

The usage information that is collected by the usage engine and stored (e.g. in the underlying database) can also reflect a manner of access to the data object by a user. For example, usage data can indicate mere passive access to view the data object (e.g. in a display mode), or alternatively can indicate that changes were actually made to that data object (e.g. in an editing mode). The purposeful nature of the latter activity, may possibly reveal a higher degree of user interest in the data object, and hence increase its ranking for placement on the shelf according to the algorithm.

The system also provides a heuristic learning module 130 which is in communication with the usage tracking engine. The heuristic learning module assigns a ranking to the data objects that have been accessed by a user. This ranking determines whether or not a data object should be located on the shelf.

One or more of the following factors may be considered by the heuristic learning module in determining those data objects to be placed on the shelf for convenient access, and those data objects that are to be removed from the shelf:

frequency of access to the data object by a particular user;
recency of access to the data object by a particular user;
personalization settings of a particular user;
prior manual placement of a data object by a particular user;
the geographic location of a particular user; and
calendar entries of a particular user.

Based upon this input, the learning module will produce as output, an object ranking list. A personalization setting 132 may determine the number of the top data objects in the ranking that may be stored on the shelf. This setting may be influenced by factors such as available storage capacity.

In some embodiments, a personalization setting may decide the top N (number) of data objects on the ranking list that are allowed to be placed in the shelf. In such cases a total number of data objects showing up on the shelf, is determined by the ranking and by the personalization setting.

While FIG. 1 shows the usage tracking engine as present in the application layer overlying the database layer, this is not required. In certain embodiments the usage tracking engine could be located in the database layer.

For example, in-memory database architectures may provide for powerful processing capacity being present the database layer. One example of an in-memory database is the HANA database available from SAP AG of Walldorf, Germany.

In addition to the HANA database just mentioned, other examples of in-memory databases include but are not limited to: the SYBASE IQ database also available from SAP AG; the Microsoft Embedded SQL for C (ESQL/C) database available from Microsoft Corp. of Redmond, Wash.; and the Exalytics In-Memory database available from Oracle Corp. of Redwood Shores, Calif. Embodiments of usage tracking approaches as described herein may be particular suited for implementation in conjunction with such in-memory databases, but alternatively may also be used in conjunction with traditional disk-based database architectures.

Figure 2:
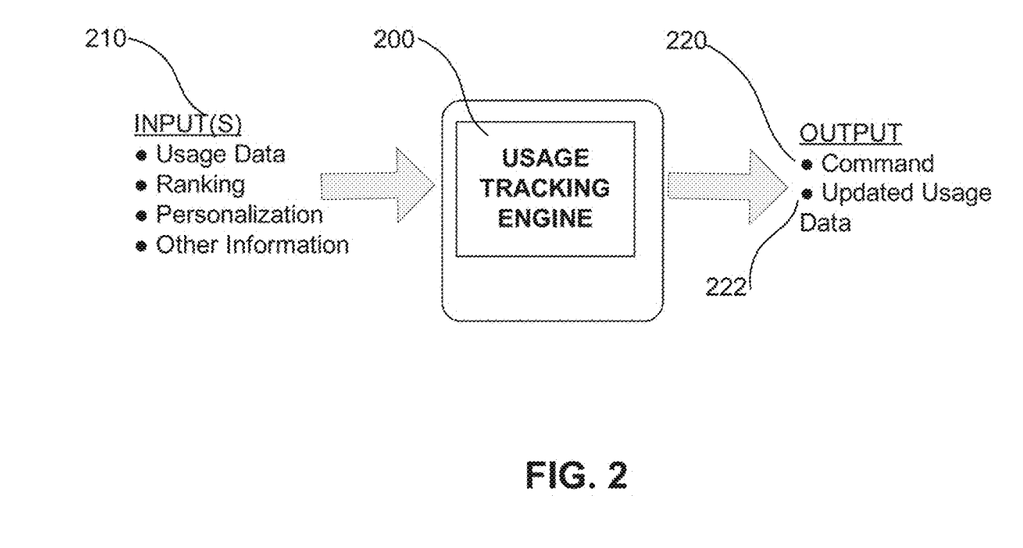
FIG. 2 is an enlarged view showing inputs and outputs to a usage tracking engine according to an embodiment.

FIG. 2 provides a simplified block diagram of the usage tracking engine according to an embodiment. The usage tracking engine 200 is configured to receive as inputs 210, one or more of the following relating to a specific data object:

usage data (e.g. frequency and/or recency of per-user access to the data object)
a ranking of the data object (e.g. from the heuristic learning module)
personalization information (e.g. a # of ranked data objects allowed in the shelf)
other information (e.g. user geographic location; user calendar entries).

From these inputs 210, the usage tracking engine is configured to produce a first output 220 comprising a command. That command causes a particular data object to either not be placed on the shelf, or to be placed on the shelf for convenient user access (and thereby potentially displacing lower ranked data objects from the shelf).

As mentioned herein, the usage tracking engine may be responsible not only for moving data objects to/from the shelf based upon usage information, but may also be responsible for updating that usage information in order to reflect recent user access to particular data objects. Accordingly, FIG. 2 also shows a second output 222 from the usage tracking engine in the form of updated usage data. In some embodiments this updated usage data may be stored in the underlying database (for example in the form of appended columns).

FIG. 2 shows the usage tracking engine as receiving the "other information" (e.g. user geographic location; user calendar entries) as direct inputs. However, in some embodiments this information could instead be received indirectly from the heuristic learning module, in the form of a consideration that is used in determining the ranking.

Figure 3:
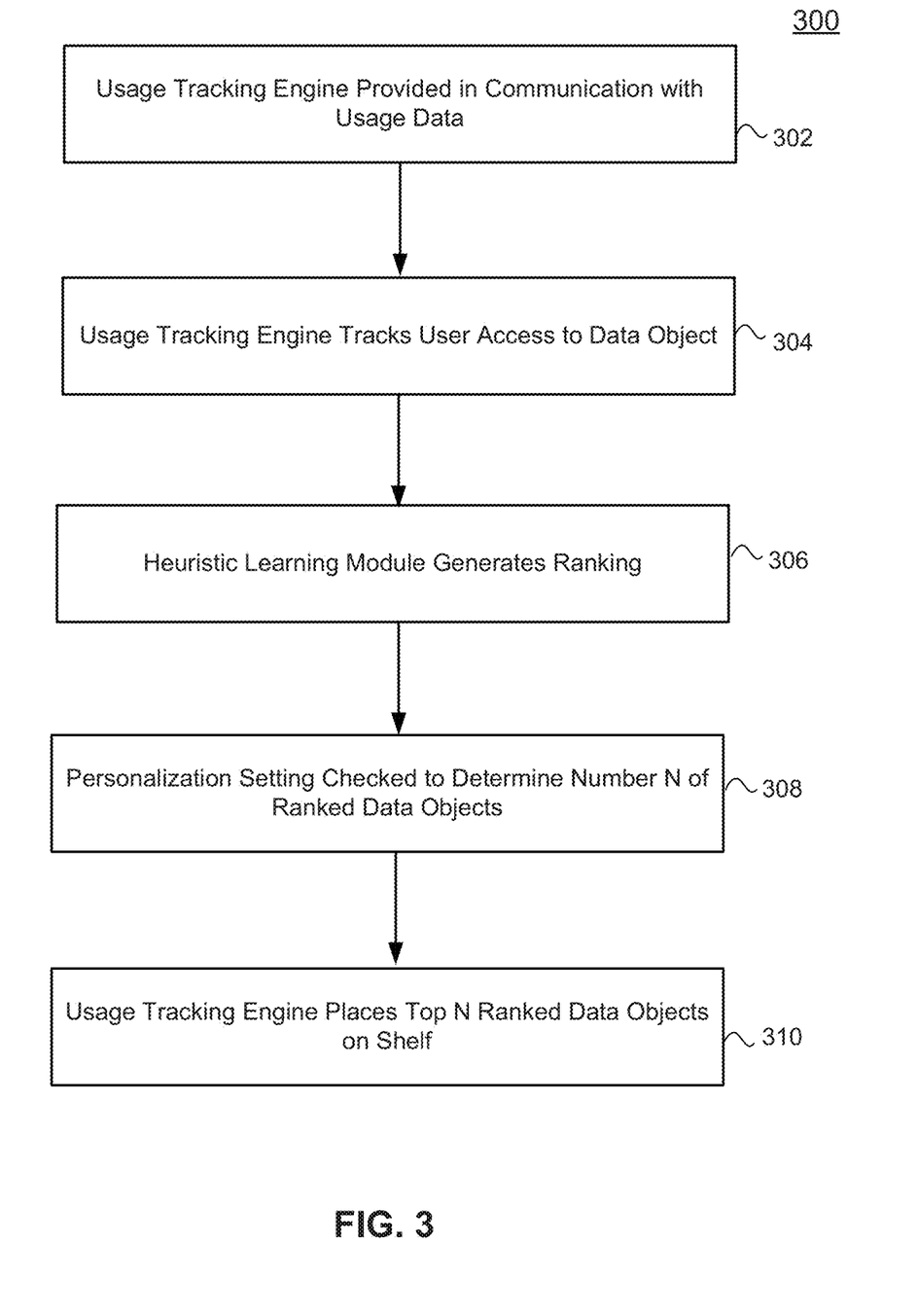
FIG. 3 is a simplified flow diagram showing a method according to an embodiment.

FIG. 3 provides a simplified flow diagram of a method 300 according to an embodiment. In a first step 302, a usage tracking engine is provided in communication with per-user usage data of business data objects of an underlying database.

In a second step 304, access and/or changing of any business data objects are tracked by usage tracking engine according to usage data. In a third step 306, a heuristic learning module communicates with the usage tracking engine in order to generate a ranking list of business data objects that can be put on the shelf.

In a fourth step 308, a personalization setting is checked to determine the top number N of business data objects for placing on the shelf. In a fifth step 310, the usage tracking engine puts those top N business data objects automatically on the shelf.

EXAMPLE

Figure 4:
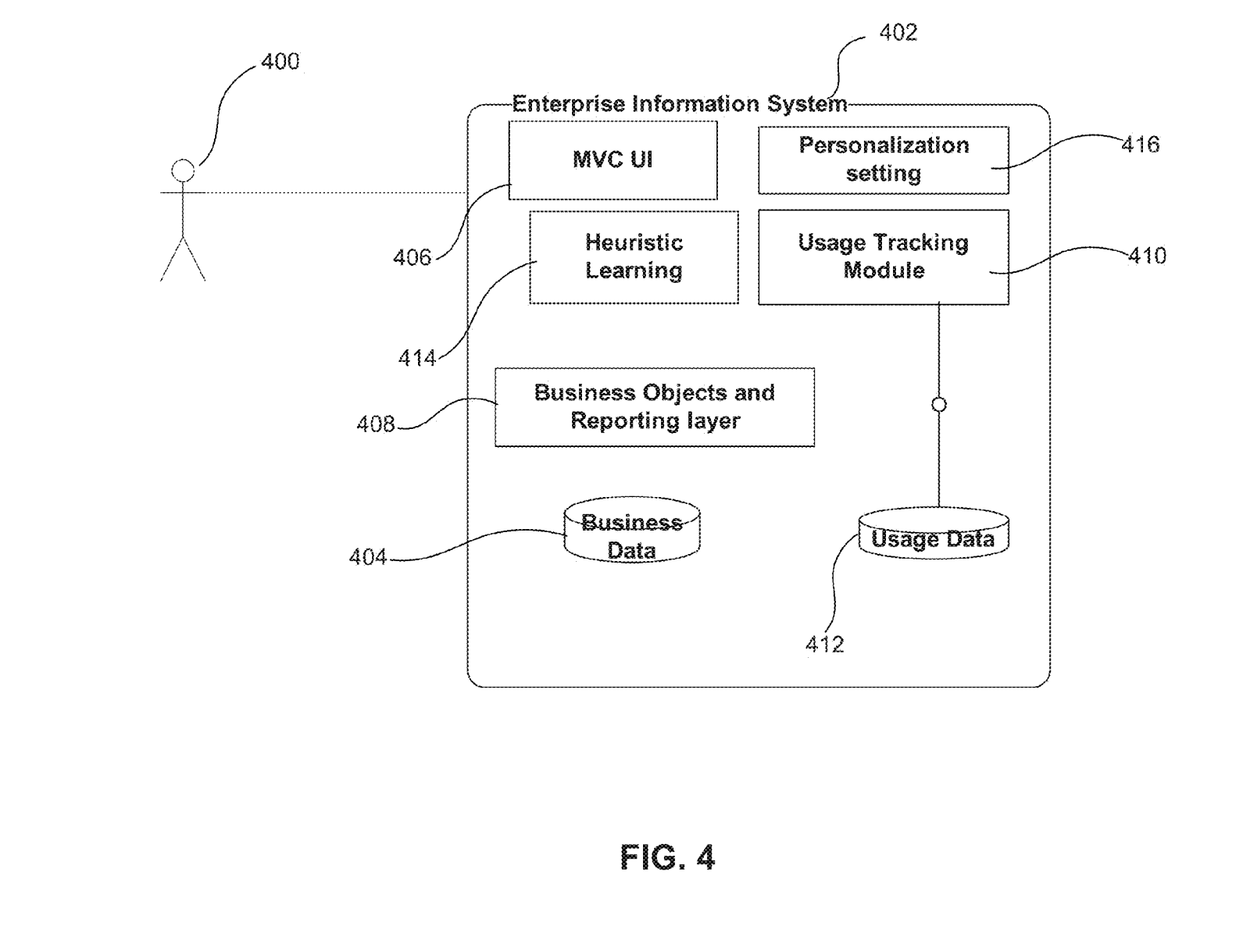
FIG. 4 is a simplified diagram showing one example of an enterprise information system configured to perform tracking of business data object usage according to an embodiment.

FIG. 4 provides a summary of certain elements of an embodiment of an automated system according to an embodiment. User 400 communicates with an Enterprise Information System 402 to access Business Data 404 in the form of data objects.

In particular, the user interacts with a Model-View-Controller (MVC) User Interface (UI) 406 in order to communicate with a Business Objects and Reporting layer 408. That layer may include the query engine that is responsible for communicating with the underlying database.

To this existing infrastructure, embodiments provide a Usage Tracking Engine 410 that is in communication with stored Usage Data 412. The Usage Tracking Engine is also in communication with a Heuristic Learning module 414 that is responsible for generating a ranking of data objects based upon the usage data. A Personalization setting 416 may determine a number of the highest-ranked data objects that can be stored on a shelf or other construct to facilitate access by the user.

In the manner described above, various embodiments may address an automated process that can relieve the manual intervention conventionally required to flag or mark as favorite, particular business objects on the shelf. This automated process thereby allows more intelligent business enterprise information systems to be provided.

Various embodiments may offer certain benefits to the database user. In particular, embodiments automate the management of end user's "shelf" in an intuitive, logical, and predictable way, that is based upon implementation of a known algorithm. Less relevant information (e.g. antiquated, discontinued, or stale data objects) may be automatically displaced from the shelf, thereby bowing to considerations of limited storage capacity and ensuring storage of the most important and the most relevant information on the shelf.

Figure 5:
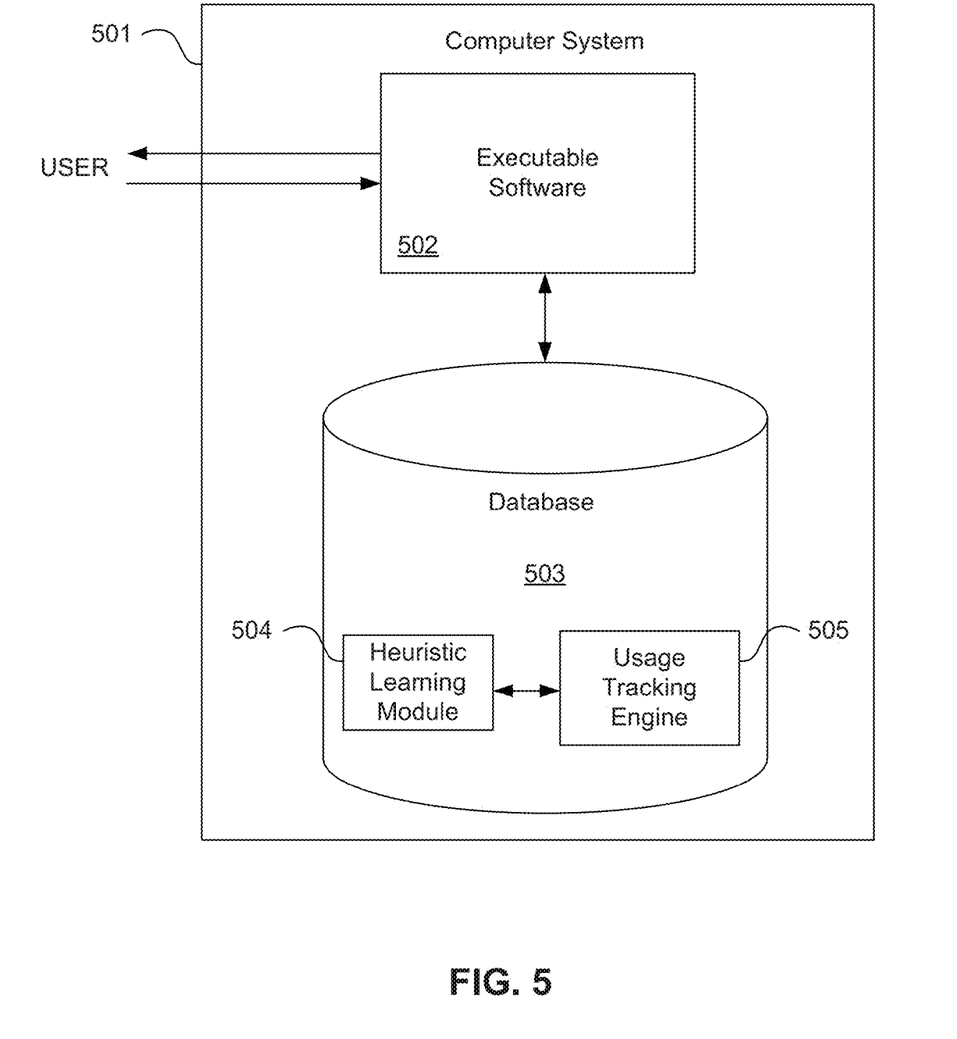
FIG. 5 illustrates hardware of a special purpose computing machine configured with a method according to the above disclosure.

FIG. 5 illustrates hardware of a special purpose computing machine configured with a process according to the above disclosure. The following hardware description is merely one example. It is to be understood that a variety of computers topologies may be used to implement the above described techniques. In particular, computer system 500 comprises a processor 502 that is in electronic communication with a non-transitory computer-readable storage medium 503. This computer-readable storage medium has stored thereon code 504 corresponding to heuristic learning module. Code 505 corresponds to a usage tracking engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 6:
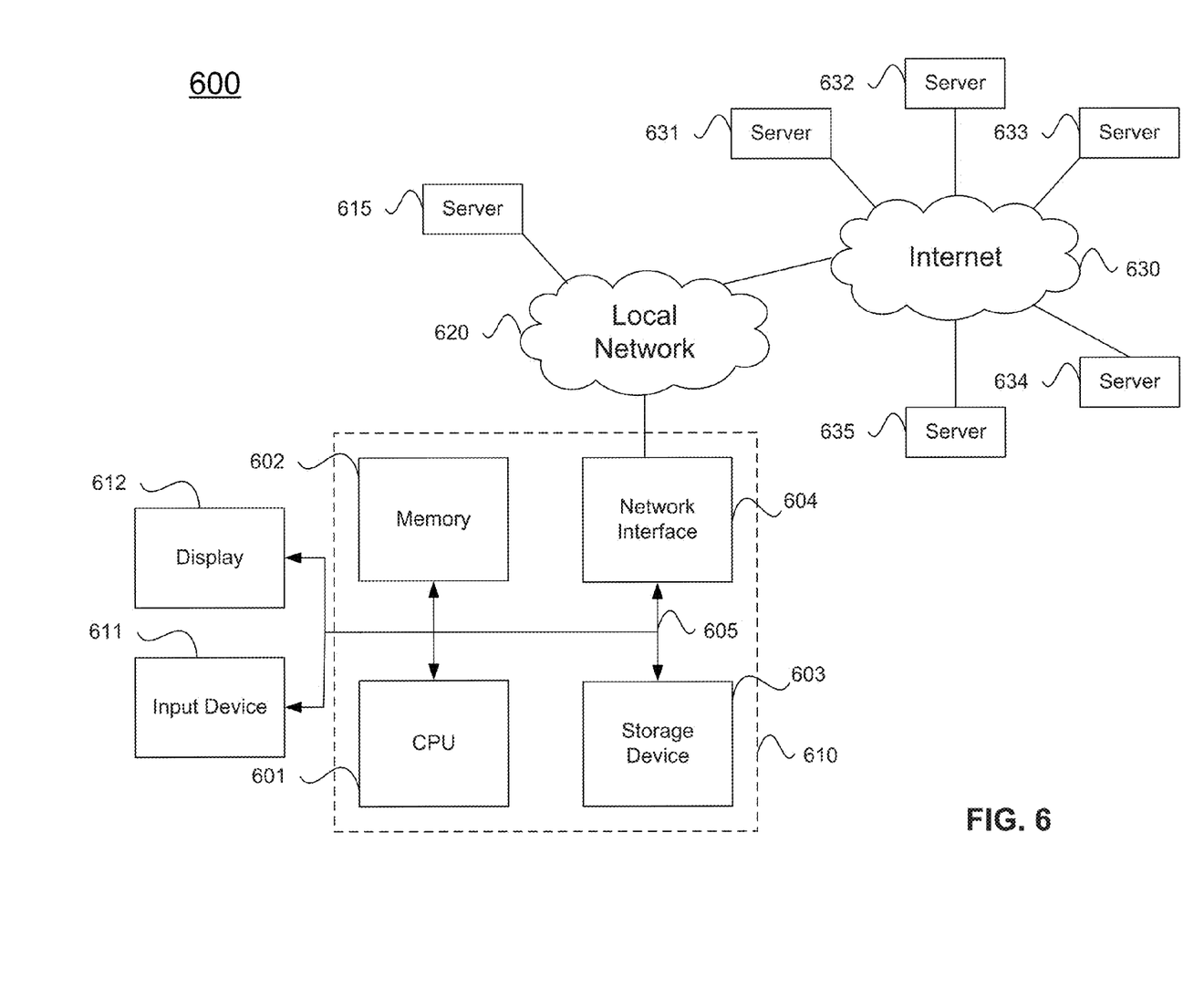
FIG. 6 illustrates a system according to an embodiment.

An example system 600 is illustrated in FIG. 6. Computer system 610 includes a bus 605 or other communication mechanism for communicating information, and one or more processor(s) 601 coupled with bus 605 for processing information. Computer system 610 also includes a memory 602 coupled to bus 605 for storing information and instructions to be executed by processor 601, including information and instructions for performing some of the techniques described above, for example. This memory may also be used for storing programs executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 603 may include source code, binary code, or software files for performing the techniques above, for example. Storage device and memory are both examples of non-transitory computer readable storage mediums.

Computer system 610 may be coupled via bus 605 to a display 612 for displaying information to a computer user. An input device 611 such as a keyboard, touchscreen, and/or mouse is coupled to bus 605 for communicating information and command selections from the user to processor 601. The combination of these components allows the user to communicate with the system. In some systems, bus 605 represents multiple specialized buses, for example.

Computer system 610 also includes a network interface 604 coupled with bus 605. Network interface 604 may provide two-way data communication between computer system 610 and a local network 620. The network interface 604 may be a wireless or wired connection, for example. Computer system 610 can send and receive information through the network interface 604 across a local area network, an Intranet, a cellular network, or the Internet, for example. One example implementation may include a browser executing on a computing system 610 that renders interactive presentations that integrate with remote server applications as described above. In the Internet example, a browser, for example, may access data and features on backend systems that may reside on multiple different hardware servers 631-635 across the network. Servers 631-

635 and server applications may also reside in a cloud computing environment, for example.

The above description illustrates various embodiment and their implementation in an example. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
    providing a usage tracking engine in an in-memory database and in communication with usage data of a data object of the in-memory database;
    causing the usage tracking engine to track access to the data object by a database user;
    causing the usage tracking engine to receive a ranking of the data object from a heuristic learning module in the in-memory database that considers:
        a geographic location of the database user,
        a time stamp of access to the data object by the database user, and
        prior manual placement of the data object in a shelf by the database user;
    causing the usage tracking engine to check a personalization setting reflecting a number of data objects to be located on the shelf in an application layer accessible to the database user, the number based upon a storage capacity available to the database user; and
    causing the usage tracking engine to displace the data object from the shelf based upon the ranking and the personalization setting.

2. The method of claim 1 wherein the usage information reflects a frequency of accessing the data object by the database user.

3. The method of claim 1 wherein the usage information reflects a recency of accessing the data object by the database user.

4. The method of claim 1 wherein the usage information is stored in the in-memory database.

5. The method of claim 1 wherein the ranking further reflects a calendar entry of the database user.

6. The method of claim 1 wherein the heuristic learning module further considers whether the database user changed the data object, wherein a change in the data object increases the ranking.

7. A computer system comprising:
    a processor; and
    a non-transitory computer readable medium having stored thereon one or more programs, which when executed by the processor, causes the processor to:
    provide a usage tracking engine in an in-memory database and in communication with usage data of a data object of the in-memory database;
    cause the usage tracking engine to track access to the data object by a database user;
    cause the usage tracking engine to receive a ranking of the data object from a heuristic learning module in the in-memory database that considers:
        a geographic location of the database user,
        a time stamp of access to the data object by the database user, and
        prior manual placement of the data object in a shelf by the database user;
    cause the usage tracking engine to check a personalization setting reflecting a number of data objects to be located on the shelf in an application layer accessible to the database user, the number based upon a storage capacity available to the database user; and
    cause the usage tracking engine to displace the data object from the shelf based upon the ranking and the personalization setting.

8. The computer system of claim 7 wherein the usage information reflects a frequency of accessing the data object by the database user.

9. The computer system of claim 7 wherein the usage information reflects a recency of accessing the data object by the database user.

10. The computer system of claim 7 wherein the usage information is stored in the in-memory database.

11. The computer system of claim 7 wherein the ranking further reflects a calendar entry of the database user.

12. The computer system of claim 7 wherein the heuristic learning module further considers whether the database user changed the data object, wherein a change in the data object increases the ranking.

13. A non-transitory computer readable storage medium storing one or more programs, the one or more programs comprising instructions for:
    providing a usage tracking engine in an in-memory database and in communication with usage data of a data object of the in-memory database;
    causing the usage tracking engine to track access to the data object by a database user;
    causing the usage tracking engine to receive a ranking of the data object from a heuristic learning module in the in-memory database that considers,
        a geographic location of the database user,
        a time stamp of access to the data object by the database user, and
        prior manual placement of the data object in a shelf by the database user;
    causing the usage tracking engine to check a personalization setting reflecting a number of data objects to be located on the shelf in an application layer accessible to the database user, the number based upon a storage capacity available to the database user; and
    causing the usage tracking engine to displace the data object from the shelf based upon the ranking and the personalization setting.

14. The non-transitory computer readable storage medium of claim 13 wherein the usage information reflects a frequency of accessing the data object by the database user.

15. The non-transitory computer readable storage medium of claim 13 wherein the usage information reflects a recency of accessing the data object by the database user.

16. The non-transitory computer readable storage medium of claim 13 wherein the usage information is stored in the in-memory database.

17. The non-transitory computer readable storage medium of claim 13 wherein the ranking further reflects a calendar entry of the database user.

18. The non-transitory computer readable storage medium of claim 13 wherein the heuristic learning module further considers whether the database user changed the data object, wherein a change in the data object increases the ranking.

* * * * *